E. T. JENKS.
CHAIN TYPE LATHE DOG.
APPLICATION FILED JUNE 11, 1918.
1,330,710. Patented Feb. 10, 1920.
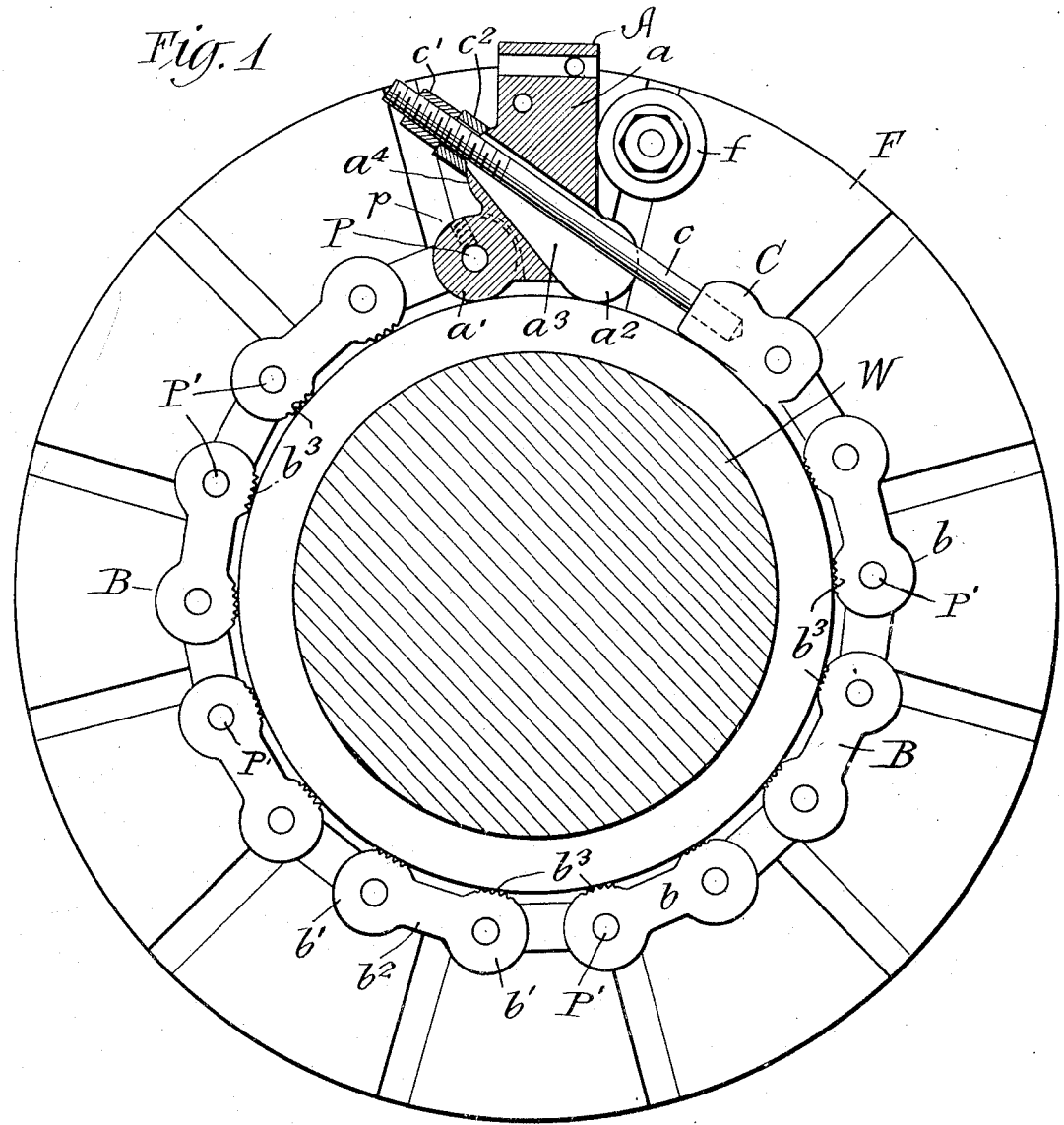
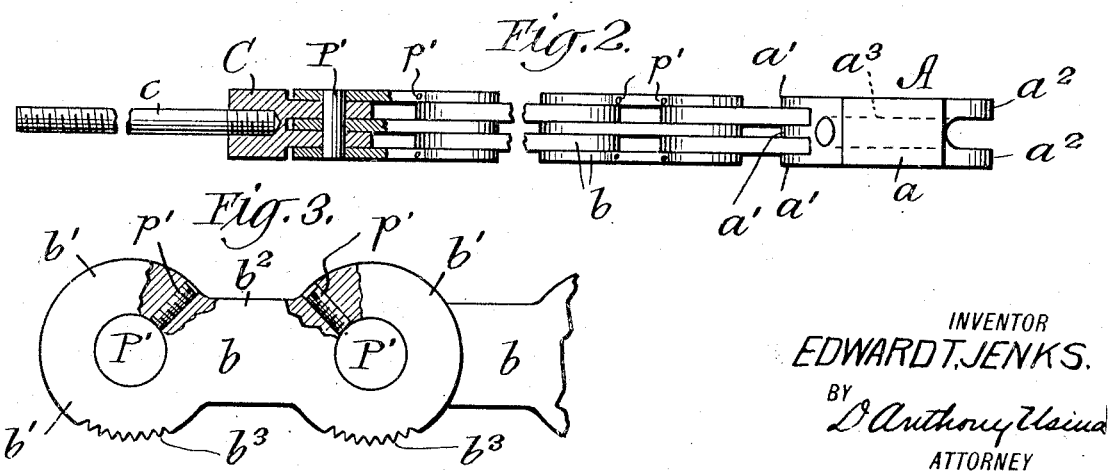
INVENTOR
EDWARD T. JENKS.
BY
D. Anthony Usina
ATTORNEY

UNITED STATES PATENT OFFICE.

EDWARD T. JENKS, OF GARY, INDIANA.

CHAIN-TYPE LATHE-DOG.

1,330,710.

Specification of Letters Patent.

Patented Feb. 10, 1920.

Application filed June 11, 1918. Serial No. 239,392.

*To all whom it may concern:*

Be it known that I, EDWARD T. JENKS, a citizen of the United States, residing at 322 Bridge street, Gary, Indiana, have invented certain new and useful Improvements in Chain-Type Lathe-Dogs, of which the following is a specification.

The present invention relates to dogs for gripping and driving large work which is to be turned in a lathe or similar machine tool.

One of the objects is to provide a lathe dog in which the gripping action is evenly distributed over practically the entire length of the work clamping member of the device.

Another object is to provide a dog having a greater gripping area than the dogs of this class have heretofore possessed.

A further object is the provision of a lathe dog that can quickly and easily be adjusted to varying sizes of work.

Another object is to combine the several elements herein described to perform the various functions set forth.

Other objects will be apparent from the following specification and claim when read in connection with the accompanying drawings in which—

Figure 1 is a front view partly in section showing my improved lathe dog secured to a work-piece and arranged to be driven by a typical form of face plate;

Fig. 2 is a plan view of the dog laid out flat, parts being shown in section in the interest of clearness and a number of the intermediate links being omitted to enable the parts to be shown at a generous scale;

Fig. 3 is a detail side elevation of a portion of the flexible clamping member of the dog, parts being broken away to show the means for holding the removable pintles in position.

Referring to the drawing my improved lathe dog comprises essentially a head block A, an adjustable flexible clamping and gripping member B, and a tail block C which is provided with means for drawing up the flexible clamp B to secure the dog to the work W.

The head clamp comprises a body portion $a$ having two work engaging bosses $a'$ and $a^2$ which are preferably smooth but in some instances may be provided with gripping teeth.

A removable pin P held against lateral movement by a set screw $p$ detachably secures the head block A to the flexible clamp B. This clamp is constructed of a multiplicity of links B-shaped as shown in Fig. 3, each having enlarged curved work engaging ends $b'$, $b'$ joined by a neck $b^2$. One face of each link is smooth and the opposite face is provided with gripping teeth $b^3$. The several links $b$ are joined by removable pins P′ which are held against lateral movement by set screws $p'$ carried by the outside links of the clamp. The removable pins permit of rapidly making a rough adjustment of the length of the flexible clamp to adapt it for different sizes of work.

The tail block C has a bolt $c$ threaded into its free end as shown in Figs. 1 and 2. This bolt passes through a slot $a^3$ formed in the head block A, and is provided with a nut $c'$. A self centering washer $c^2$ seated on the convex boss $a^4$ of the head block forms a compensating abutment for the nut $c'$ to impinge against and provides a good bearing for the nut at the various angles the bolt $c$ assumes when used on different sizes of work.

In operation the length of the clamp B is first approximately adjusted to encircle the work by either adding or removing a sufficient number of links and then it is securely clamped to the work by turning up the nut $c'$. This causes the multiplicity of toothed gripping links to securely hold the dog on the work. The driving action of the stud $f$ secured to the face plate F will also tend to tighten the clamp.

A lathe dog constructed as above described possesses many advantages over the typical dogs now in use. By providing a flexible clamp made up of a multiplicity of toothed links a much better gripping action is obtained than has heretofore been attainable. When heavy cuts are being made on the work the cutting resistance has a great tendency to cause typical forms of lathe dogs to slip on the work, but with my improved dog having teeth on all the links of the flexible clamp it is impossible for the dog to slip relatively to the work, furthermore, the action of the face plate driving lug actually tends to tighten the clamp upon the work.

When heavy roughening cuts are taken in a lathe a great strain is put on the dog and for such roughening cuts the toothed side of the flexible clamp is used to get the greatest gripping action.

When finishing cuts are made the work is usually driven at a higher speed and lighter cuts are made. During such operations, if desirable, the clamp B may be reversed by moving the pin $p$ to present the smooth side to the work. The reversible feature is of importance when the clamp is to be applied to finished portions of the work.

I am aware of the fact that it is not broadly new to use a chain clamp for lathe dogs but believe that the means for increasing the gripping action and adjusting the length of the flexible clamp are marked improvements over the disclosures of the prior art. No loose inactive links are present when the dog is in operation which is an objectionable feature of former chain type lathe dogs.

While I have described the embodiment illustrated in minute detail it is not to be construed that I am limited thereto as it is clear that structural changes may be made by those skilled in the art without departing from the spirit and scope of the invention as set forth in the appended claim.

What I claim is:

A lathe dog comprising, in combination, a head block, a link chain connected by one end to said head block, a tail block on the other end of said chain, said links being detachably connected one to another and to the head and tail blocks to permit of variation in the number of chain links between the head and tail blocks, and a bolt on the tail block adapted to project through a tangential opening in the head block and arranged to be adjusted relative to the head block to rigidly fasten the head block and chain on the work to which the lathe dog is applied.

In witness whereof, I have hereunto signed my name.

EDWARD T. JENKS.